United States Patent
Kratel et al.

Patent Number: 5,458,916
Date of Patent: Oct. 17, 1995

[54] HYDROPHOBICIZATION OF PYROGENIC SILICA

[75] Inventors: Günter Kratel, Durach-Bechen; Ernst Mühlhofer, Sulzberg/Allg.; Peter Scherm, Emmerting, all of Germany

[73] Assignee: Wacker-Chemie GmbH, Munich, Germany

[21] Appl. No.: 287,541

[22] Filed: Aug. 8, 1994

Related U.S. Application Data

[63] Continuation of Ser. No. 60,132, May 13, 1993, abandoned.

[30] Foreign Application Priority Data

Jul. 2, 1992 [DE] Germany .................... 42 21 716.4

[51] Int. Cl.⁶ .................................................. B05D 7/00
[52] U.S. Cl. .................. 427/213; 427/215; 427/372.2
[58] Field of Search .................................. 427/213, 215, 427/372.2

[56] References Cited

U.S. PATENT DOCUMENTS

| | | | |
|---|---|---|---|
| 3,924,029 | 12/1975 | Schutte et al. | 427/213 |
| 4,015,031 | 3/1977 | Reinhardt et al. | 427/213 |

FOREIGN PATENT DOCUMENTS

| | | |
|---|---|---|
| 1163784 | 2/1964 | Germany . |
| 1496553 | 12/1977 | United Kingdom . |

OTHER PUBLICATIONS

Patent Abstract of Japan vol. 5, No. 62 (C–52), Apr. 25, 1981 & JP–A–56 014 414 (Tokuyama Soda Co.), Feb. 12, 1981.
Database WPI, Derwent Publications Ltd., London, GB, AN 68–16086Q & SU–A–203 207 (Dering et al.), Sep. 28, 1967.

Primary Examiner—Shrive Beck
Assistant Examiner—David M. Maiorana
Attorney, Agent, or Firm—Martin Connaughton

[57] ABSTRACT

A process for continuously rendering finely divided, pyrogenic silica hydrophobic at low temperatures in the presence of a hydrophobicizing aid such as aliphatic alcohols having from 1 to 3 carbon atoms. The process of rendering silica hydrophobic is conducted at temperatures of from 60° to 350° C., and more preferably from 80° to 150° C., over a period of from 2 to 5 hours, and more preferably from 3 to 4 hours. The hydrophobicizing agents are known organohalosilanes and the preferred hydrophobicizing aid is methanol. The hydrophobicizing aid is used in amounts of from 2% to 15% by weight, and more preferably in amounts of from 2% to 10% by weight, based on the weight of silica used.

6 Claims, 3 Drawing Sheets

HYDROPHOBICIZATION OF PYROGENIC SILICA

This application is a continuation of application Ser. No. 08/060,132, filed May 13, 1993, now abandoned.

The invention relates to a continuous process for rendering finely divided, pyrogenic silica hydrophobic at low temperatures using aliphatic alcohols having 1 to 3 carbon atoms.

BACKGROUND OF THE INVENTION

DE-C-1 163 784 discloses a process for rendering pyrogenic silica having silanol groups at its surface hydrophobic by treating with dimethyldichlorosilane in a cocurrent fluidized bed at 200°–800° C., preferably at 400°–600° C., in the presence of water vapor and under an inert gas, for example nitrogen.

Processes which have been employed heretofore to render pyrogenic silica hydrophobic have the disadvantage that the reaction has to be carried out at high temperatures. It is accordingly necessary to supply a great deal of energy in the form of heat. This increases inter alia the manufacturing costs of the hydrophobic product.

Therefore, it is an object of the present invention to provide a process for rendering silica hydrophobic at low temperatures.

SUMMARY OF THE INVENTION

The foregoing object and others which will become apparent from the following description are accomplished in accordance with this invention, generally speaking, by providing a process for continuously rendering pyrogenic silica obtained from silicon halide compounds hydrophobic, which comprises contacting the pyrogenic silica with organohalosilanes in the presence of at least one aliphatic alcohol having 1 to 3 carbon atoms.

DESCRIPTION OF THE INVENTION

The pyrogenic silica produced in a conventional manner from silicon halide compounds is, after removal of the smoke fumes, contacted with an organohalosilane as hydrophobicizing agent, in the presence of at least one aliphatic alcohol as a hydrophobicizing aid, water vapor and an inert gas supply. The process to render the pyrogenic silica hydrophobic is preferably carried out countercurrently.

In the preferred embodiment, the process of the invention is carried out in an integrated system with the process for producing the pyrogenic silica.

Removal of the smoke fumes from the pyrogenic silica produced from the silicon halide contents is effected using for example suitable filters. For rendering the $SiO_2$ hydrophobic, it is preferably passed downward into a suitable silo-like reaction space. The reaction space preferably has thermal insulation. It is heated to the temperature required to render the silica hydrophobic in accordance with the process of this invention. After the desired fill level has been reached, the reaction space is charged in vapor form with the hydrophobicizing agent, the hydrophobicizing aid, the water vapor and the inert gas. These substances are preferably introduced into the lower third of the reaction space. The substances are metered in at a temperature between 110° and 140° C., preferably between 120° and 130° C., and more preferably at 125° C. Preferably the hydrophobicizing agent, the hydrophobicizing aid and/or the water vapor will have been diluted with the inert gas before being introduced.

The hydrophobicization of the silica is effected at temperatures of from 60° to 350° C., preferably from 80° to 150° C., over a period of from 2 to 5 hours, and more preferably from 3 to 4 hours.

The hydrophobicizing agent is selected from known organohalosilanes. Preference is given to alkylchloro compounds, and more preferably dimethyldichlorosilane.

The hydrophobicizing aid is selected from aliphatic alcohols having from 1 to 3 carbon atoms. The preferred hydrophobicizing aid is methanol.

The hydrophobicizing aid is used in amounts of from 2% to 15% by weight, and more preferably in amounts of from 2% to 10% by weight, based on the weight of the silica used.

The inert gas used is preferably nitrogen.

By using a hydrophobicizing aid according to this invention it is possible to carry out the hydrophobicization of pyrogenic $SiO_2$ using appreciably less energy than heretofore generally employed. Furthermore, the process of the present invention ensures good hydrophobicization of the silica even at a high silica flow rate.

The drawings show various embodiments of the process of the invention. However, the possible use of the process of the invention is not restricted to these embodiments.

Figure 1:
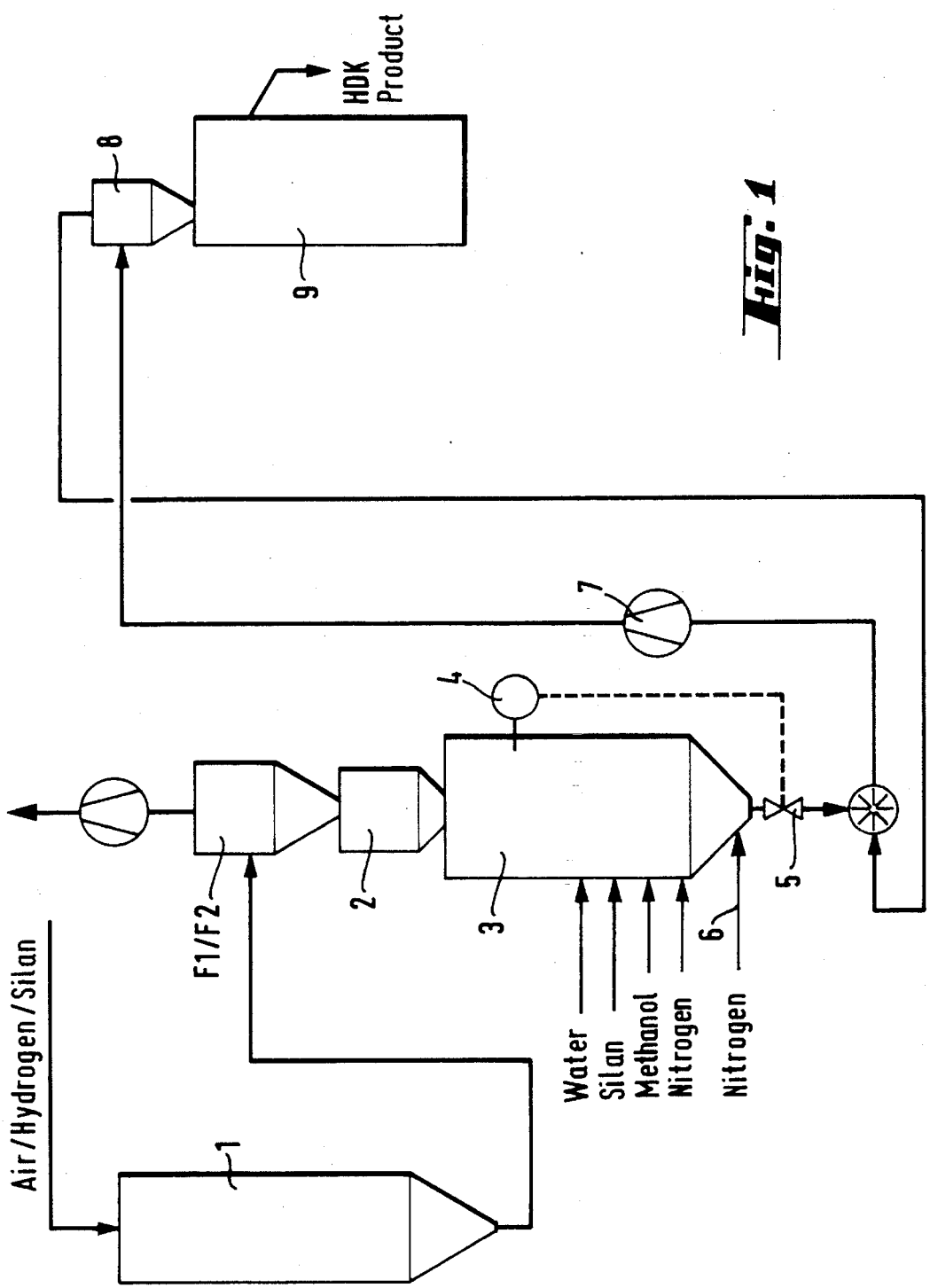
FIG. 1 illustrates a process for preparing hydrophobic silica.

In the embodiment illustrated in FIG. 1, silica is produced by burning an organohalosilane in a combustion chamber 1. This is effected for example by burning methyldichlorosilane with air. The filters F1/F2 remove the fumes, which contain hydrogen chloride and chlorine, from the pyrogenic $SiO_2$. The silica passes via an intermediate funnel 2 into the reaction space, which hereinafter will be referred to as the hydrophobicization silo. In the hydrophobicization silo 3 the level of silica is sensed by a fill level sensor 4 which controls a regulator 5 to maintain the desired fill level. The fill level in the hydrophobicization silo is preferably determined using a radioactive fill level sensor. The regulator 5 preferably takes the form of a regulating flap. The lower third of the silo is charged at a temperature of 110 to 140° C. in vapor form, each vapor charge having been diluted with hot inert gas, with the hydrophobicizing agent, hydrophobicizing aid, water vapor and additional inert gas.

Inert gas pulses 6 directly above the regulating flap 5, thus ensuring the flow of silica through the regulating flap 5. This moreover prevents larger amounts of hydrogen chloride gas or hydrophobicizing agent from passing into the moving bed dryer 9.

The hydrophobicized silica passes out of the hydrophobicization silo 3 via a conveying loop, consisting of at least one blower 7 and at least one cyclone 8, to the moving bed dryer 9. There the hydrophobicized silica is deacidified.

Figure 2:
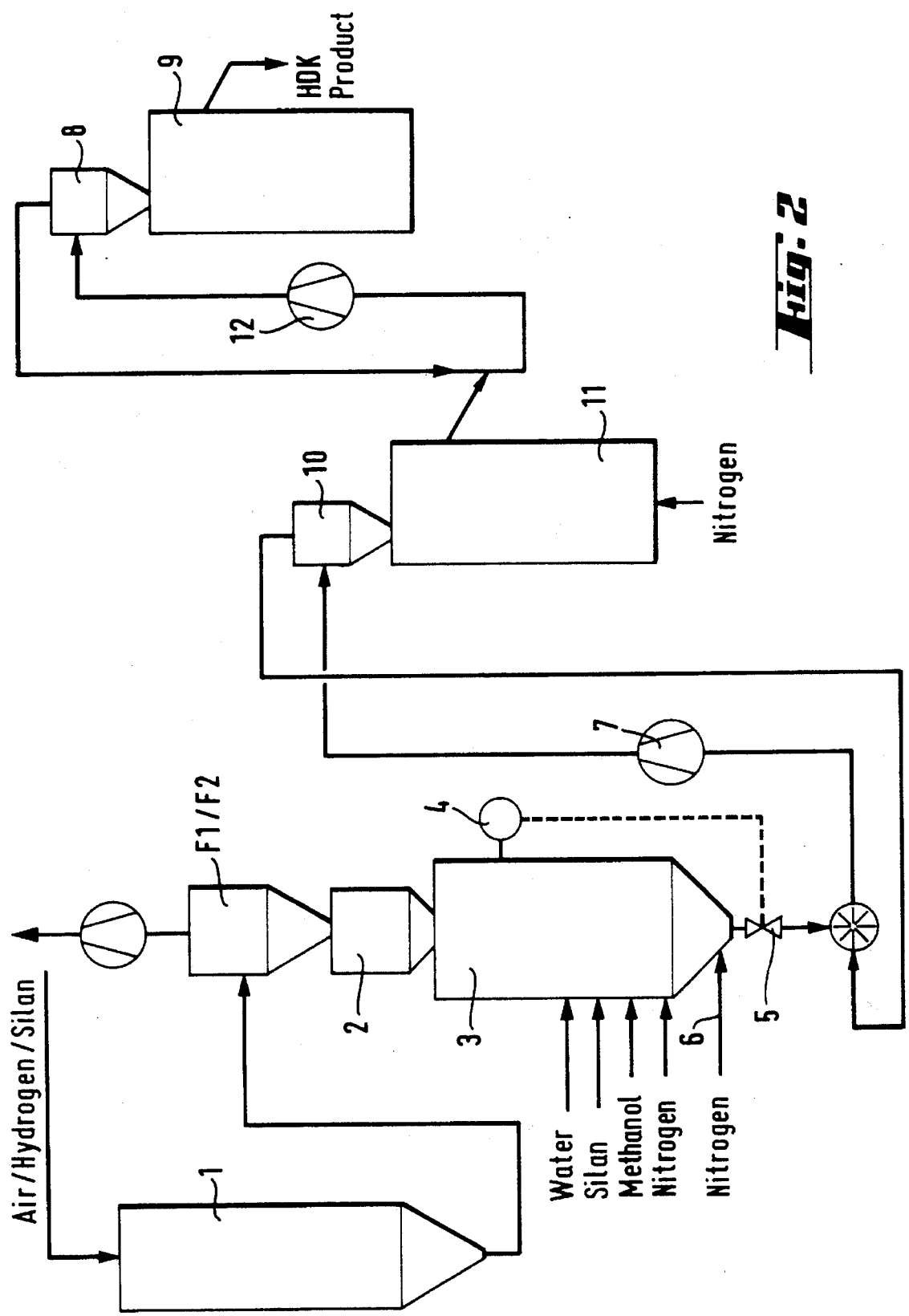
FIG. 2 illustrates another process for preparing hydrophobic silica.

An alternative embodiment of the process of the present invention is illustrated in FIG. 2. The production of the pyrogenic silica and the hydrophobicization using the hydrophobicizing aid are each conducted in accordance with the process described for FIG. 1. In this embodiment the amount of hydrophobicizing agent used is preferably 2% to 4% by weight, based on the weight of silica used. The hydrophobicized silica is conveyed by a blower 7 and a cyclone 10 out of the hydrophobicization silo 3, via the regulating flap 5, into a fluidized bed reactor 11. There it is heated to 300° to 350° C. and then conveyed via a conveying loop comprising blower 12 and cyclone 8 into the moving bed dryer 9. The use of the fluidizing bed reactor makes it possible to reduce the amount of hydrophobicizing aid which has to be used by up to 70% compared with the embodiment illustrated in FIG. 1.

Figure 3:
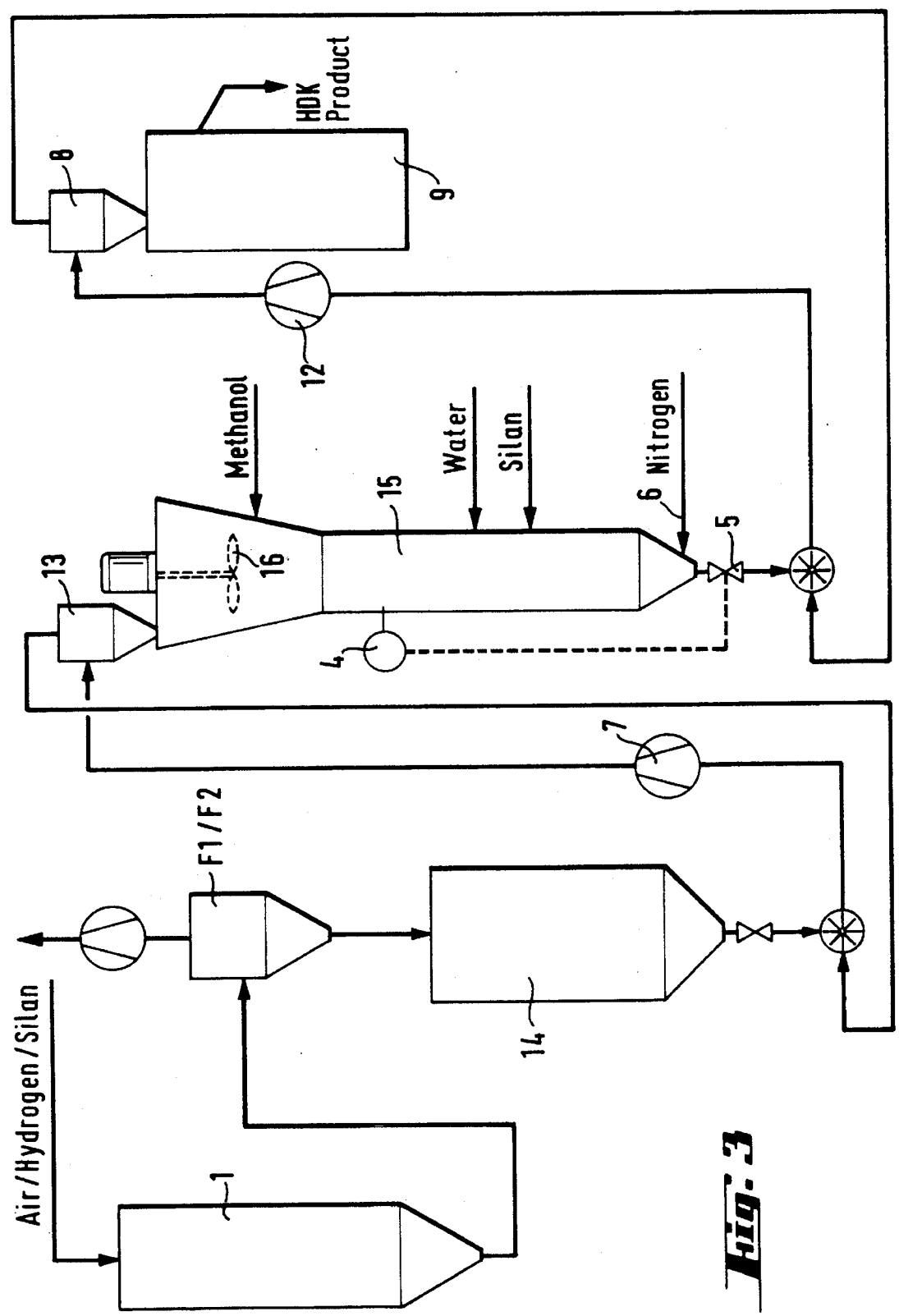
FIG. 3 illustrates a third process for preparing hydrophobic silica.

In still another embodiment of the process of the present invention, the hydrophobicization silo and the fluidized bed reactor form a single reactor, as shown in FIG. 3. In a combustion chamber 1 silica is produced in a conventional manner by burning an organohalosilane. The filters F1/F2 are used to separate off the fumes which contain hydrogen chloride and chlorine. The pyrogenic silica first passes into a buffer vessel 2 and from there via a blower 7 and a cyclone 3 into the reactor 15. The reactor has a conically expanded top half and a tubular bottom half. The expanded top half of the reactor 15 is preferably heated from the outside to a temperature of from 80° to 120° C. The reactor is equipped with a fill level sensor 4 which controls a regulator at the reactor outlet 5. The reactor is also equipped in the top half with a device for fluidizing the silica 16. A stirrer is particularly suitable for this purpose. The top half of the reactor is charged at its lower end at about 125° C. with a mixture of inert gas and hydrophobicizing aid. The lower region of the tubular part of the reactor, the walls of which are heated to about 350° C., is charged from at least one inlet point each with a mixture of water vapor and inert gas and with a mixture of hydrophobicizing agent and inert gas, each mixture being in gaseous form. Preferably, pulsed nitrogen is metered in via, for example, a regulating flap. The hydrophobicized, pyrogenic silica is transported by a conveying loop via the blower 12 and the cyclone 8 into a dryer, where it is deacidified, and conveyed into silos for hydrophobicization.

The following examples further illustrate the present invention.

EXAMPLE 1

In a plant corresponding to FIG. 1, the reaction flame, in which 108 kg/hr of methyltrichlorosilane and hydrogen are burned, deposits 43 kg/hr of $SiO_2$ into the thermally insulated hydrophobicization silo. This hydrophobicization silo, whose temperature is 135° to 137° C. in the upper part and 109° to 110° C. at its center and whose internal pressure is maintained at +13 and +29 mbar by means of a manual slider 13, is charged via separate lines with 4.5 kg/hr of dimethyldichlorosilane (diluted with 0.8 $m^3$/hr of nitrogen), 3.3 kg/hr of methanol (diluted with 0.8 $m^3$/hr of nitrogen), and 1.5 to 2 kg/hr of water (diluted with 1 $m^3$/hr of nitrogen) each in gaseous form at 125° C. The upper part of the hydrophobicization silo is charged with 1 $m^3$/hr of nitrogen. The level regulating flap at the bottom end of the hydrophobicization silo introduces 3 $m^3$/hr of nitrogen in pulses. The hydrophobicized $SiO_2$ passes through the moving bed dryer at temperatures between 240° C. and 280° C. and an under pressure of −4.5 mbar.

The surface of the resulting hydrophobicized $SiO_2$ has the following properties: BET surface area: 165 $m^2$/g; pH: 4.1 and carbon content: 1.03%.

EXAMPLE 2

In a plant corresponding to FIG. 2, the reaction flame, in which 108 kg/hr of methyltrichlorosilane and hydrogen are burned, deposits 43 kg/hr of $SiO_2$ into a thermally insulated hydrophobicization silo 3. This hydrophobicization silo, whose temperature is 128° to 130° C. in the upper part and 103° to 108° C. at its center and whose internal pressure is maintained at +3 and +32 mbar, is charged via separate lines with 4.8 kg/hr of dimethyldichlorosilane (diluted with 0.8 $m^3$/hr of nitrogen), 1.0 kg/hr of methanol (diluted with 0.8 $m^3$/hr of nitrogen) and 1.5 to 1.8 kg/hr of water (diluted with 1 $m^3$/hr of nitrogen) each in gaseous form at 125° C. The upper part of the hydrophobicization silo is charged with 1 $m^3$/hr of nitrogen. The level regulating flap introduces 4 $m^3$/hr of nitrogen in pulses. Downstream of the hydrophobicization silo the $SiO_2$ passes through the fluidized bed reactor 11, which is charged with an additional 5 $m^3$/hr of nitrogen and in which the $SiO_2$ is brought to temperatures between 305° and 348° C. An underpressure of −1 mbar prevails in the fluidized bed reactor. Downstream of the fluidized bed reactor the hydrophobicized $SiO_2$ is passed through a dryer at temperatures between 290° and 300° C.

The surface of the resulting hydrophobicized $SiO_2$ has the following properties: BET surface area: 173 $m^2$/g; pH: 4.2 and carbon content: 1.19%.

What is claimed is:

1. A continuous process for rendering pyrogenic silica hydrophobic which comprises treating pyrogenic silica obtained from silicon halide compounds, with organohalosilanes in the presence of methanol, wherein the organohalosilanes and the methanol are in a gaseous form.

2. The process of claim 1, wherein the pyrogenic silica is treated at temperatures between 60° and 350° C.

3. The process of claim 1, wherein the pyrogenic silica is treated in a thermally insulated hydrophobicization silo.

4. The process of claim 3, wherein the thermally insulated hydrophobicization silo is equipped with a radioactive fill level sensor.

5. The process of claim 3, wherein the thermally insulated hydrophobicization silo has on the downstream side a fluidized bed reactor in which the treated $SiO_2$ is heated to 300° to 350° C.

6. The process of claim 1, wherein the hydrophobic silica is deacidified in a moving bed dryer.

* * * * *

UNITED STATES PATENT AND TRADEMARK OFFICE
CERTIFICATE OF CORRECTION

PATENT NO. : 5,458,916
DATED : October 17, 1995
INVENTOR(S) : Gunter Kratel, Ernst Muhlhofer and Peter Scherm It is certified that error appears in the above-indentified patent and that said Letters Patent is hereby corrected as shown below:

Claim 1, column 4, line 37, after "rendering" delete "pyrogenie" and insert in lieu of --- pyrogenic ---; line 38, after "treating" delete "pyrogenie" and insert in lieu of --- pyrogenic ---.

Signed and Sealed this

Thirteenth Day of February, 1996

Attest:

BRUCE LEHMAN

*Attesting Officer*  *Commissioner of Patents and Trademarks*